(12) United States Patent
Englert et al.

(10) Patent No.: US 7,862,687 B2
(45) Date of Patent: Jan. 4, 2011

(54) PROCESS FOR PRODUCING A LOW DENSITY ACOUSTICAL PANEL WITH IMPROVED SOUND ABSORPTION

(75) Inventors: Mark H. Englert, Libertyville, IL (US); Qing Yu, Libertyville, IL (US)

(73) Assignee: United States Gypsum Company, Chicago, IL (US)

( * ) Notice: Subject to any disclaimer, the term of this patent is extended or adjusted under 35 U.S.C. 154(b) by 635 days.

(21) Appl. No.: 11/943,375

(22) Filed: Nov. 20, 2007

(65) Prior Publication Data

US 2009/0126886 A1     May 21, 2009

(51) Int. Cl.
*D21H 13/40* (2006.01)
*D21H 21/18* (2006.01)

(52) U.S. Cl. ................ 162/152; 162/158; 162/175; 162/217

(58) Field of Classification Search .......... 162/152, 162/158, 175, 217
See application file for complete search history.

(56) References Cited

U.S. PATENT DOCUMENTS

| | | | |
|---|---|---|---|
| 3,498,404 A | | 3/1970 | Roberts |
| 4,062,721 A | * | 12/1977 | Guyer et al. ............... 162/101 |
| 4,263,093 A | * | 4/1981 | Shenk ....................... 162/109 |
| 5,047,120 A | | 9/1991 | Izard et al. |
| 5,071,511 A | | 12/1991 | Pittman |
| 5,124,805 A | | 6/1992 | Chung et al. |
| 5,250,153 A | | 10/1993 | Izard et al. |
| 5,558,710 A | | 9/1996 | Baig |
| 5,905,234 A | | 5/1999 | Tsukamoto et al. |
| 5,911,818 A | | 6/1999 | Baig |
| 5,964,934 A | | 10/1999 | Englert |
| 6,109,388 A | | 8/2000 | Tsukamoto et al. |
| 6,443,256 B1 | * | 9/2002 | Baig ......................... 181/286 |

(Continued)

FOREIGN PATENT DOCUMENTS

JP     54063514 A     5/1979

(Continued)

OTHER PUBLICATIONS

North American Insulation Manufacturers Association, Insulation Facts #63 Health and Safety Facts for Rock and Slag Wool, www.naima.org, Pub. No. NO41 Apr. 2002.

(Continued)

*Primary Examiner*—Matthew J. Daniels
*Assistant Examiner*—Dennis Cordray
(74) *Attorney, Agent, or Firm*—Novak Druce + Quigg LLP (57) ABSTRACT

A process useful for producing low density high mineral wool based acoustical panels with improved acoustical absorption properties using a water felting process is disclosed. The process includes forming a dilute slurry mixture including water, mineral wool, a thermoplastic binder and/or starch; and distributing the dilute slurry on a porous carrier to have the slurry dewatered to a base mat by gravity drainage to remove water by gravity. A vacuum is adjusted to gradually apply vacuum to the gravity dewatered base mat to further dewater the base mat without subjecting the mat to static pressure that would compress the base mat. The base mat is dried to form an acoustical ceiling product that has a low density and excellent acoustical absorption properties.

11 Claims, 5 Drawing Sheets

U.S. PATENT DOCUMENTS

| | | |
|---|---|---|
| 6,616,804 B2 * | 9/2003 | Foster et al. ............... 162/129 |
| 6,855,753 B1 | 2/2005 | Englert |
| 2004/0209071 A1 | 10/2004 | Carbo et al. |
| 2005/0191465 A1 | 9/2005 | Mayers et al. |
| 2007/0056705 A1 * | 3/2007 | Baig et al. ................ 162/135 |

FOREIGN PATENT DOCUMENTS

| | | |
|---|---|---|
| JP | 58072441 A | 4/1983 |
| WO | WO 88/05097 A * | 7/1988 |

OTHER PUBLICATIONS

USG Corporation, Material Safety Data Sheet BRIO™ClimaPlus™ Acoustical Ceiling Panels and Tiles, MSDS #41-100-002, www.usg.com, (May 25, 2005), pp. 1-9.

USG Corporation, Construction selector, www.usg.com, SA100 (rev. Mar. 2002).

Thermafiber, Inc., Thermafiber SOUNDZERO® Fabric-Faced Interior Acoustical Blanket product sheet, TRF719 (rev. Feb. 2006).

Armstrong World Industries, Material Data Safety Sheet #23 for PrivacyGuard™ Plus/Max Man made Vitreous Fiber Acoustical Core Board (Oct. 29, 2002), www.armstrong.com/privacyguard (2002).

Armstrong World Industries, product Sheet for PrivacyGuard™ Plus Man made Vitreous Fiber Acoustical Core Board, www.armstrong.com/privacyguard (2002).

Armstrong World Industries, product Sheet for PrivacyGuard™ Max Man made Vitreous Fiber Acoustical Core Board, www.armstrong.com/privacyguard (2003).

AIA/Architectural Record Continuing Education Series, Understanding Acoustics in Architectural Design, advertising Supplement provided by USG Corporation, www.usg.com, p. 168 (undated) Printed 2007.

Thermafiber, Inc., Thermafiber® NCR-Absorption Coefficients 1/3 Oct. Band Center Freq. Hz (Jul. 12, 2004).

International Search Report of patent cooperation treaty application No. PCT/US2008/079338.

* cited by examiner

PROCESS FOR PRODUCING A LOW DENSITY ACOUSTICAL PANEL WITH IMPROVED SOUND ABSORPTION

FIELD OF THE INVENTION

This invention relates to a process for preparing low density high mineral wool acoustical tiles and panels for ceiling and other applications with improved sound absorption. More particularly, the invention relates to an acoustical panel composition made using an improved water felting process for achieving a lower density high mineral wool acoustical ceiling product with higher NRC values than acoustical panels made using the conventional water felting process.

BACKGROUND OF THE INVENTION

The water felting of dilute aqueous dispersions of mineral wool and lightweight aggregate is a well known commercial process for manufacturing acoustical ceiling tile or panels. In this process, aqueous slurry of mineral wool, lightweight aggregate, cellulose fiber, binder and other desired ingredients is flowed onto a moving foraminous support wire, such as that of a Fourdinier or Oliver mat forming machine, for dewatering. The slurry may be first dewatered by gravity and then dewatered by vacuum suction means to form a base mat. The wet base mat is then pressed (with or without the application of additional vacuum) to the desired thickness between rolls and a support wire to remove additional water. The wet base mat is dried in heated convection drying ovens and the dried material is cut to the desired dimensions, fissured and/or perforated to impart acoustical absorbency and optionally top coated, such as with paint, to produce acoustical tiles and panels.

Mineral wool acoustical tiles are necessarily very porous to provide good sound absorption. As taught in U.S. Pat. Nos. 3,498,404; 5,047,120 and 5,558,710, all incorporated herein by reference in their entirety, mineral wool fibers have also been incorporated into the composition to improve sound absorption properties and to provide lightweight acoustical tiles or panels.

U.S. Pat. No. 5,964,934, incorporated herein by reference in its entirety, teaches the use of an expanded perlite, treated with a silicone compound to reduce its water retention, in a furnish of mineral wool, expanded perlite, cellulose fiber, and optionally a secondary binder in a water-felting process to produce an acoustical tile product.

Acoustical tile composition must contain a binder, which has typically employed starch. U.S. Pat. Nos. 5,911,818 and 5,964,934, incorporated herein by reference in their entirety, suggest that as much as 15% by weight of the composition may be starch although 6-7% by weight is more normally used.

U.S. Pat. No. 5,250,153, incorporated herein by reference in its entirety, describes the use of latex binders for acoustical tile compositions and a wide variety of latex binders have been suggested for this use.

U.S. Pat. No. 6,855,753, incorporated herein by reference in its entirety, has suggested that a wet-strength resin such as a polyamine epichlorohydrin resin be used to replace conventional starch binder and that the resulting composition may be more efficiently fabricated into acoustical tiles and panels in a water felting process.

US Patent Application Publication Number 2004/209071 A1, incorporated herein by reference in its entirety, discloses a composition for slurry for manufacture of acoustical panels includes one or more fillers, one or more binders, and water and zinc pyrithione.

US Patent Application Publication Number 2005191465 A1, incorporated herein by reference in its entirety, discloses an abuse-resistant, cast acoustical ceiling tile having improved impact resistance and excellent sound absorption values. The ceiling tiles have aggregate particles applied to the surface of a wet pulp in the casting process and the particles are embedded in the pulp by compression with a roll and/or smoothing plates.

A CONSTELLATION brand base mat is a sag-resistant, lightweight mineral panel produced on a foraminous support wire by forming a dilute aqueous dispersion of mineral fiber, an anionically stabilized latex binder and a binder, coupling the binder solids onto the mineral fiber materials by adding a small amount of a flocculant such as through the use of a cationic polyacrylamide, and passing the slurry onto a first flooded section of the support wire to form an open, entangled, structural mass having water in interstitial spaces of the entangled mass. Water is stripped from the mass and the mass dried by passing heated dry air through the open entangled structure.

MARS CLIMAPLUS® brand acoustical panel produced by USG Interiors, Inc. is a high-end acoustical ceiling product utilizing a back-coated CONSTELLATION base mat and a laminated non-woven fiberglass scrim facer. The MARS brand product has many advantages, including a smooth white texture, excellent high-humidity sag performance, good acoustical value, high recycled content, low formaldehyde emissions, and antimicrobial properties. The current MARS brand product is ¾" (1.91 cm) thick with a NRC of 0.70 and a ceiling attenuation class (hereinafter also referred as "CAC") of 35.

Noise reduction coefficient (NRC) is a scale representation of the amount of sound energy absorbed upon striking a particular surface, with a NRC value of 0 indicating perfect reflection and a NRC of 1 representing perfect absorption of sound energy. The NRC value is an average of four sound absorption coefficients of the particular surface at frequencies of 250 HZ, 500 HZ, 1000 HZ and 2000 HZ, which cover the range of typical human speech. In laboratory test of materials in a laboratory per ASTM C423, only the face of the sample is exposed to the sound energy, as would be the case in a typical installation. Under some circumstances NRC's greater than 1 may be obtained, but this is an artifact of the test method due to diffraction/edge to area effects.

The Ceiling Attenuation Class (CAC) rating quantifies how much sound is lost when it is transmitted through the ceiling of one room into an adjacent room through a common plenum. A higher CAC rating indicates that the ceiling system allows less sound transmission. The CAC is measured using the test standard ASTM E 1414, in which the sound levels are measured in the source room and an adjacent room.

The Normal Incident Sound Absorption can be determined in accordance with a modified ASTM E1050-98, in which the Normal Incident Sound Absorption is measured in an impedance tube from the average of four frequencies, i.e., 250, 500, 1000 and 1600 Hz. The ASTM E 1050-98 is "modified" because the fourth frequency is 1600 Hz, not 2000 Hz. The sample is tested without a backing air space, i.e., with the acoustical panel resting on a flat metal surface, on a Brüel & Klaer Pulse™ Material testing system consisting of Pulse™ Material testing Program Type 7758, Two-microphone Impedance Measurement Tube Type 4206 (400 mm diameter), Power Amplifier Type 2706 and Pulse™, the Multianalyzer System Type 3560. The ENRC value is often used as a measure of the acoustical absorption properties of a lab sample.

A higher NRC product with the advantages of the current MARS CLIMAPLUS® brand acoustical panel product would be desirable.

There have also been attempts to produce a higher noise reduction coefficient (NRC) Constellation product using the water felting process by lowering the stock flow of the composition in an attempt to produce a lower density product, but these attempts only produced a product that had a comparative density to conventional panels but at a reduced product thickness.

SUMMARY OF THE INVENTION

The present invention provides a process of making an acoustical ceiling panel with an open structure and improved acoustical absorption properties comprising;

providing an aqueous slurry mixture comprising mineral wool, at least one member of the group consisting of thermoplastic binder, starch and mixtures of thermoplastic binder and starch, and optional additives, wherein the aqueous slurry has a solids concentration of 3.0 to 6.0 wt. %;

distributing the slurry on a porous carrier;

dewatering the distributed slurry, said dewatering comprising gravity draining the slurry on the porous carrier over at least one gravity drainage box to form a gravity drained base mat, wherein the slurry is gravity drained to a water concentration of 74 to 84 wt. % over a time period of 2 to 20 seconds; and vacuum draining to remove water by applying a first vacuum to the gravity drained base mat, typically a vacuum of at most about 0.7 inches of Hg, for example about 0.3 to 0.7, e.g. about 0.5, inches of Hg, for about 2-20 seconds, to remove about 18% to 34% of the water in the base mat and then applying a second vacuum to the gravity drained base mat to remove an additional 10% to 52% of the water from the gravity drained base mat (relative to the amount of water in the base mat after the base mat is subjected to the first application of vacuum), wherein the second application of vacuum is typically at a vacuum of about 2.0-4.0 inches of Hg for about 2-20 seconds, to increase the amount of vacuum drainage without significantly compressing the mat through static pressure, such that the vacuum draining increases the density of the dried base mat by 0% to 10% on a dry basis relative to the gravity drained base mat; and wherein the vacuum drained mat on a dry basis has a density of about 10.9 to about 15.0 pounds per cubic foot, and a noise reduction coefficient of about 0.80 to about 0.95.

The process of the invention allows the production of a low density high mineral wool acoustical mat or panel with improved acoustical absorption through production of a lower density, more open mat structure. In the process a dilute slurry of water, mineral wool, thermoplastic binder and/or starch and minor ingredients is dewatered first by gravity drainage and then by gradually increasing levels of vacuum drainage. Thus, the mat is not significantly compressed by the static pressure applied by the vacuum. The resulting mat has an increased caliper and a lower density than standard CONSTELLATION acoustical products produced through a normal water felting process. The CONSTELLATION acoustical product produced also has base mat with a higher noise reduction coefficient (hereinafter also referred to as "NRC") than mineral wool acoustical mat or panel acoustical products produced through the normal water felting process.

In particular, it is desirable to produce a low density high mineral wool acoustical mat or panel with improved acoustical absorption through production of a more open mat structure with a noise reduction coefficient (NRC) value of between about 0.80 to 0.85 and a CAC of about 33 to 36. For example, the acoustical product produced may have an NRC of 0.85 and a CAC of 35, or may have an NRC of 0.80 and a CAC of 35.

The present inventors have found a lower density, higher NRC mineral wool acoustical mat or panel product can be obtained by controlling vacuum applied during the vacuum drainage and drying steps on the wet end portion of a production line to minimize the compaction of the formed base mat. In a preferred embodiment, the wet-end operates by (1) adjusting the settings on gravity drainage boxes to allow for as much water drainage as possible from the base mat; (2) raising the level of a top wire former so there is minimal pressing of the base mat; and (3) adjusting the settings of vacuum boxes to allow for the gradual application of vacuum to the base mat.

The present invention also provides for controlling the process for making the panels of the present invention using empirical relationships between panel density, panel thickness and NRC.

The process of the present invention produces a lower density high mineral wool acoustical ceiling product with improved acoustical absorption properties comparable to higher end fiberglass products.

The present invention, by maximizing gravity drainage, raising the press position of the top wire former, eliminating dust and broke and gradually introducing vacuum, can achieve a free-formed product with 11-12 pounds per cubic foot (pcf) (176-192 kg/cu. meter) wet-end density with a NRC at or above 0.85. The nominal 12 pcf density is maintained at a trimmer despite the static pressure exerted by the downstream vacuum boxes and the application of flow-through drying.

The present invention can also obtain base mats with densities in the range of 12-12.5 pcf (192-200 kg/cu. meter) with NRC values of 0.80 to 0.90 depending upon the thickness of the base mat. The effect of providing progressively increasing vacuum levels was found to be significantly more important than providing maximum gravity drainage.

The present invention can also obtain a nominal 0.900 inch (2.29 cm) product with an NRC of 0.80 by using standard wet end set-up but with gradually increasing vacuum setting to aid production of a lower density base mat.

DETAILED DESCRIPTION OF THE PREFERRED EMBODIMENTS

A. The Panel

Figure 1:
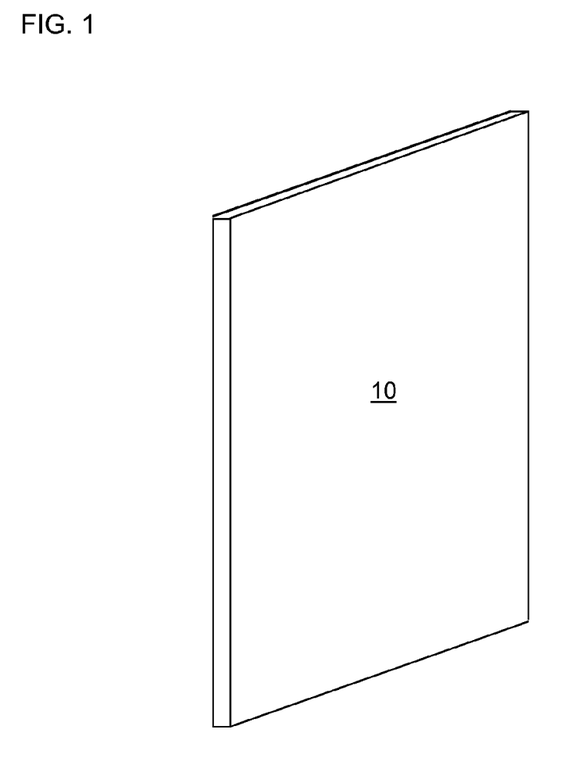
FIG. 1 is a diagram of a perspective view of an embodiment of the acoustical panel of the present invention.

FIG. 1 shows a perspective view of an embodiment of an acoustical tile or panel 10 of the present invention.

B. Formulation

In one embodiment of the invention, the ingredients of the composition used to make the panels of the invention will be mineral wool (a slag wool fiber), thermoplastic binder and/or starch, water and any optional ingredients, for example flocculants. The dry ingredients and the wet ingredients are combined to produce a dilute slurry that is deposited to form a dilute slurry layer. The mineral wool fibers added to the dilute slurry are uniformly distributed in the matrix throughout the full thickness of the slurry layer that, after further processing, will eventually form the panel. Of the total weight of dry ingredients, the panel of the invention is typically formed from about 70 to 95 wt. % mineral wool, 6 to 7 wt % of combined thermoplastic binder and starch, and water.

In a preferred embodiment, the panel would be formed from about 90-95 wt %, e.g., 93 wt. %, mineral wool, about 4.5-5 wt %, e.g., 4.7 wt. %, thermoplastic binders and 1.5-2.5 wt. %, e.g., 2.0 wt. %, starch on a dry ingredient basis.

1. Mineral Wool

The mineral wool used in the invention is a slag wool fiber sometimes referred to as synthetic vitreous (silicate) fiber of the type conventionally used in the preparation of mineral wool based acoustical tiles and panels. Mineral wool generally is a fine filament produced by fiberizing molten slag using high velocity air. The mineral wool is typically of the same type conventionally used in making mineral wool based acoustical tiles.

2. Starch and Thermoplastic Binder

The binder that can be used can be a starch, which is well known for use in mineral wool based acoustical compositions due to its cost efficiency.

Other binders that can be used with or without starch can be selected from various thermoplastic binder (latexes) conventionally used in acoustical tiles based on mineral wool. These latexes may have a glass transition temperature ranging from about 30° C. to about 110° C. Examples of these latex binders include polyvinyl acetate, vinyl acetate/acrylic emulsion, vinylidene chloride, polyvinyl chloride, styrene/acrylic co-polymer and carboxylated styrene/butadiene. Typical thermoplastic latexes are styrene acrylic latexes have a glass transition temperature in the range of 90° C. to 100° C. (194 to 212° F.).

3. Other Ingredients

Optional additional ingredients can include flocculants, cellulose fibers, lightweight aggregates like expanded perlite, clay, calcium sulfate dihydrate, and limestone. Clay is conventionally considered to be necessary to be used in amounts of at least 4% and preferably at least 20% when it is desired to impart fire resistance, as defined by ASTM Test No. E 119. Commercially available clays such as ball clays can be used for this purpose.

In addition, the acoustical compositions of this invention can include inorganic fillers such as mica, wollastonite, silica, gypsum, stucco and calcium carbonate, other lightweight aggregates, surfactants and flocculants. These ingredients are well known to those skilled in the art of making acoustical tile compositions.

Although the invention is not limited to any specific amounts of material, the present invention contemplates compositions containing the following components in the amounts shown in TABLE 1 in an aqueous slurry that has a solids content in the range of about 3 to 6 wt %.

TABLE 1

| Ingredient | Composition (dry basis) | |
| --- | --- | --- |
| | Broad Range (wt. %) | Typical Range (wt. %) |
| Mineral Wool | 70 to 95 | 91-93 |
| Starch | 0 to 4.0 | 2.0-4.0 |
| Thermoplastic Binder | 0 to 7.5 | 2.5-5.0 |
| Additional Additives | 0 to 20.0[1] | 0 to 1.0 |
| Total | 100 | 100 |

[1]Up to 20% clay additive when a panel is made to meet the requirements of fire codes.

The dilute slurry may be deposited by various methods as would occur to those familiar with the acoustical panel-making art having the benefit of the present specification. For example, rather than using a batch process to make each panel, a continuous sheet may be prepared in a similar manner, which after the material has been dried, can be cut into panels of the desired size.

C. Making a Panel of the Present Invention

In a first embodiment the present invention provides a process of making an acoustical ceiling panel with an open structure and improved acoustical absorption properties comprising;
  providing an aqueous slurry mixture comprising mineral wool, at least one member of the group consisting of thermoplastic binder, starch and mixtures of thermoplastic binder and starch, and optional additives, wherein the aqueous slurry has a solids concentration of 3.0 to 6.0 wt. %;
  distributing the slurry on a porous carrier;
  dewatering the distributed slurry, said dewatering comprising gravity draining the slurry on the porous carrier over at least one gravity drainage box to form a gravity drained base mat, wherein the slurry is gravity drained to a water concentration of 74 to 84 wt. % over a time period of 2 to 20 seconds; and
  vacuum draining to remove water by applying a first vacuum to the gravity drained base mat, typically a vacuum of at most about 0.7 inches of Hg, for example about 0.3 to 0.7, e.g. about 0.5, inches of Hg, for about 2-20 seconds, to remove about 18% to 34% of the water in the base mat and then applying a second vacuum to the gravity drained base mat to remove an additional 10% to 52% of the water from the base mat (relative to the amount of water in the base mat after the first application of vacuum), wherein the second application of vacuum is typically at a vacuum of about 2.0-4.0 inches of Hg for about 2-20 seconds, to increase the amount of vacuum drainage without significantly compressing the mat through static pressure i.e. by less than 10% relative to the thickness of the gravity drained base mat, such that the vacuum draining increases the density of the vacuum drained base mat by 0% to 10% on a dry basis relative to the gravity drained base mat; and wherein the vacuum drained base mat on a dry basis has a density of about 10.9 to about 15.0 pounds per cubic foot, and a noise reduction coefficient of about 0.80 to about 0.95.

Figure 2:
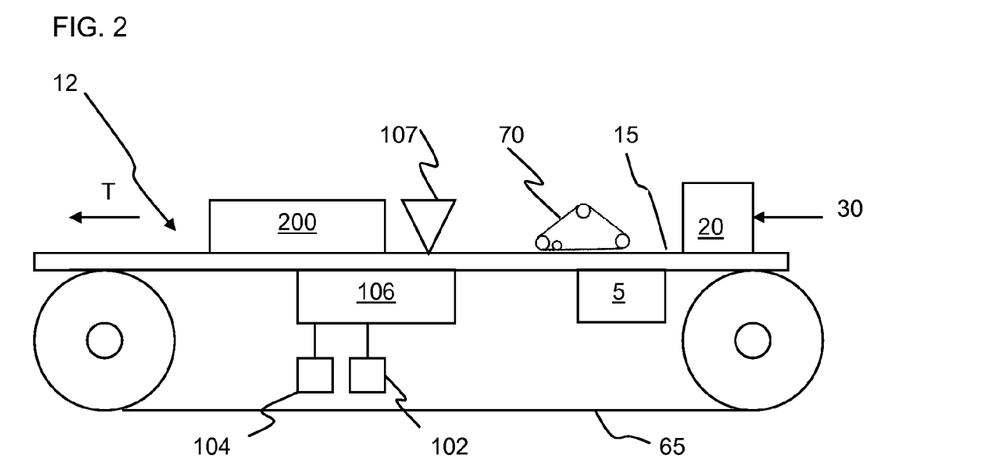
FIG. 2 is a schematic of a production line for producing a product of the present invention up to the finishing stage of the production process.
Figure 3A:
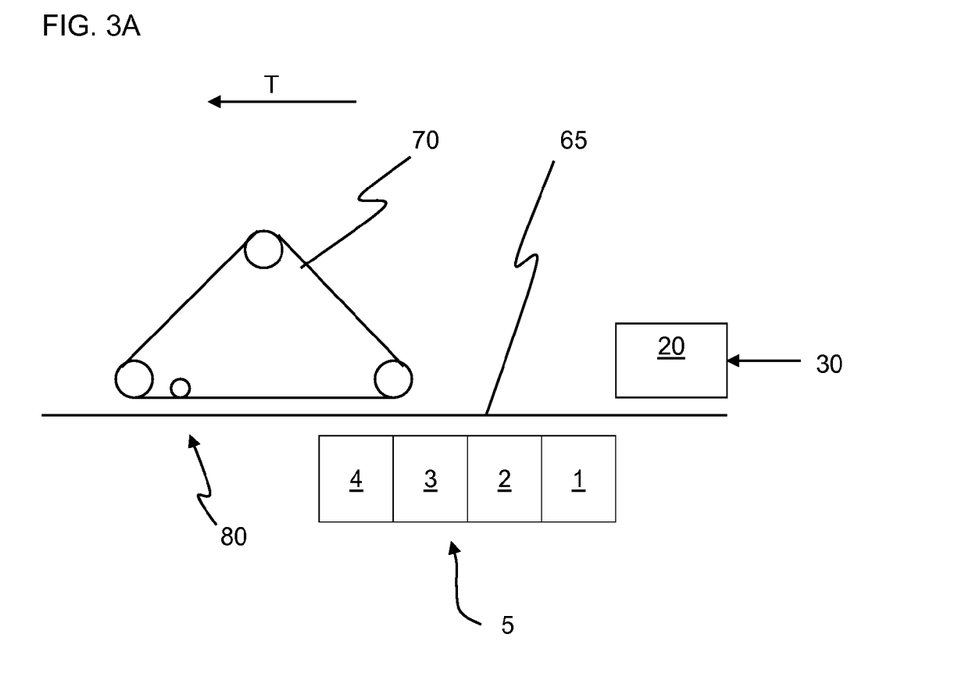
FIG. 3A is a schematic diagram of a first portion (wet end) of a production line for distributing the dilute slurry on the line and then subjecting the slurry to gravity drainage boxes and then to a top wire former press.
Figure 3B:
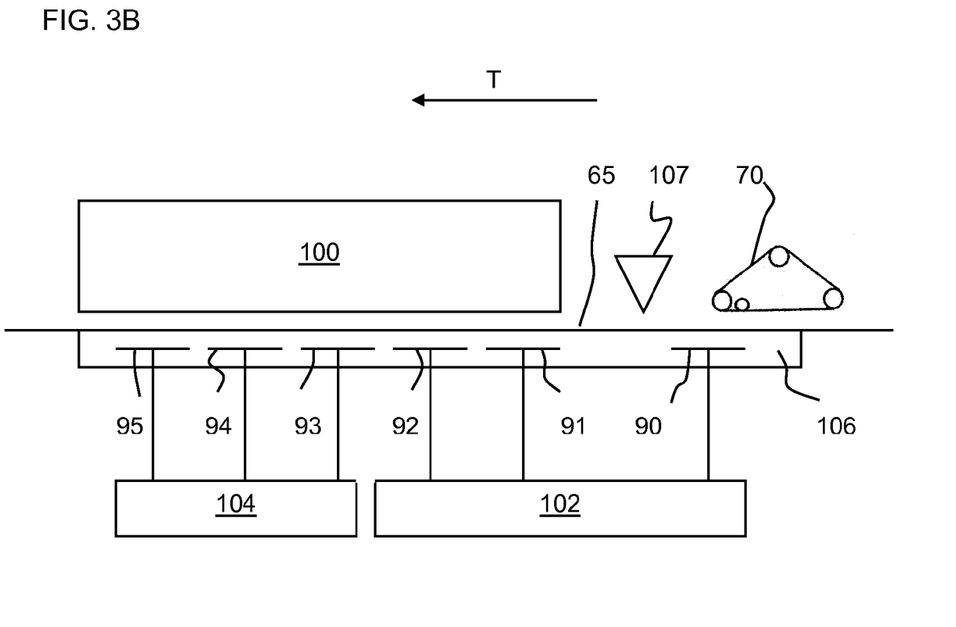
FIG. 3B is a schematic diagram of a vacuum drainage and initial dryer portion of the production line from the top wire former through the vacuum boxes.

An apparatus for performing a process of the present invention under the required operating conditions for making acoustical panel of the present invention is illustrated in the diagrams of FIGS. 2, 3A and 3B.

FIG. 2 shows an embodiment of an acoustical panel production line 12 for making the present product. Referring to FIG. 2, the process begins by mixing mineral wool with water and binder and/or starch in a conventional mixing device equipped with an agitator (not shown) to form the dilute aqueous stock slurry 30. The mineral wool may typically be of the same type conventionally used in making mineral wool based acoustical tiles. The mineral wool and binder and/or starch are mixed with sufficient water to make a stock slurry 30 of mineral wool, starch, thermoplastic binder, water and additional additives. For example, the slurry 30 may contain about 4.5% by weight solids, with mineral wool making up 93 wt. % of the solids.

As shown in FIG. 3A, the stock slurry 30 is fed into a headbox 20. The stock slurry 30 is deposited on an endless metal wire forming surface 65 to form a base mat 15 and passes over a gravity drainage system 5 having gravity drainage boxes 1, 2, 3, 4 while moving in a direction "T". The water in the slurry 30 passing through the forming surface 65 is first dewatered by gravity drainage through gravity drainage boxes 1, 2, 3, 4 (FIG. 3A) before the base mat 15 passes through a top wire former 70 and a nip 80. The four gravity drainage boxes 1, 2, 3, 4 gradually dewater the slurry.

The four gravity drainage boxes 1, 2, 3, 4 are set to open or closed positions in accordance with the desired operating conditions under this invention to form a gravity drained base mat 15.

In a standard (conventional) process for making a Constellation® brand acoustical panel product, the gravity drainage boxes 1, 2 are closed, the gravity drainage box 3 is one-half open, and the gravity drainage box 4 is fully open. Under standard (conventional) operating conditions for producing a ¾ inch (1.9 cm) acoustical panel with a 0.70 NRC, the wet-end settings are designed not to drain as much water as possible from the base mat 15, but to remove a sufficient amount of water to provide adequate caliper of the base mat at the nip point 80 so that the top belt can press the base mat and achieve a relatively smooth surface. If too much water is removed by gravity drainage, the resulting lower caliper would produce a more uneven surface and possible low spots after grinding. If too little water is removed by gravity, the base mat 15 will have too much water load in the dryer, putting too much water in the centrifugal blowers which supply downstream vacuum boxes and reduce line speed.

In the present invention gravity draining preferably comprises gravity draining the slurry on the porous carrier over at least one gravity drainage box to form a gravity drained base mat, wherein the slurry is gravity drained to a water concentration of 74 to 84 wt. % over a time period of 2 to 20 seconds. Thus, in this embodiment, preferably at least one of boxes 1, 2, 3, 4 (FIG. 3A) gravity drains the slurry to a water concentration of 74 to 84 wt. % over a time period of 2 to 20 seconds before the base mat 15 passes through a top wire former 70 and a nip 80.

The gravity drained base mat 15 is then passed under the top former wire 70 and through roller nip 80. The base mat 15 typically contains about 74-84% by weight of free water after gravity drainage and pressing, before being sent through a vacuum system 106 having six vacuum boxes 90, 91, 92, 93, 94, 95 (FIG. 3B) set for various selected vacuum conditions to apply a gradual vacuum to the base mat 15. Vacuum boxes 91, 92, 93, 94 and 95 work together with the first zone 100 of a multi-zone dryer 200. Due to dewatering and drying, through the multi-zone dryer zones, water is removed to a level of about 2% by weight in the final base mat 15.

FIG. 3B shows the production line from the top wire former 70 through the vacuum system 106 and first dryer zone 100. The vacuum system 106 has six vacuum boxes 90, 91, 92, 93, 94, 95 supplied by two large centrifugal blowers 102 and 104.

The first vacuum box labeled 90 (also referred to herein as the "press box" or "after press (AP) Box") and next two boxes 91 and 92 are fed by the centrifugal blower 102.

The second group of three vacuum boxes 93, 94 and 95 are fed by the centrifugal blower 104. A typical blower used in the industry may have from 50 to 400 horsepower and generate between 5,000 and 25,000 ft$^3$/min. (cfm) (140-700 cu. m/min) of airflow.

The base mat 15 is sent through water jet cutter 107 to cut the base mat 15 in a cross-machine direction just after the AP vacuum box 90 and prior to the base mat 15 entering the dryer 200 (FIGS. 2 and 3B).

As mentioned above, the dryer 200 is a multi-zone dryer. FIG. 3B shows the first dryer zone 100. The first dryer zone 100 is used to supply hot air to vacuum boxes 91, 92, 93, 94, 95. In contrast, the AP vacuum box 90 draws only ambient temperature air.

Under normal operating conditions, the AP box 90 and boxes 91, 92, 93 are all in the fully open position and boxes 94, 95 are fully closed. During a standard (conventional) production run the vacuum boxes 90, 91, 92, 93, 94, 95 are normally not adjusted from their natural pressure and the vacuum pressure is not monitored. Thus, in the conventional system, as much water as possible is removed by the AP box 90 and boxes 91, 92, 93 (operating in conjunction with the first zone 100 of the drier) prior to the drying in zones of the drier 200 downstream of zone 100.

However, in the present invention, the vacuum system 106 treats the base mat 15 with a gradual vacuum in AP vacuum box 90 and then through vacuum stations 91 through 92 supplied by the first centrifugal blower 102 and vacuum boxes 93, 94 and 95 supplied by the second centrifugal blower 104. Typically as much of the water is removed as possible while retaining the desired thickness or caliper of the base mat 15 as the base mat 15 passes through multi-zone dryer 200 to dry the base mat 15 to the final panel 10 that is cut to size and optionally sanded, painted and/or laminated on its surface and also provided with an optional back-coating. The back coating is generally known and used in the art. Coatings used in the art for back coating typically include latex based coating and resin based coating which are commonly typically a formaldehyde based resin such as melamine-formaldehyde resin, phenol-formaldehyde resin or urea-formaldehyde resin based coatings.

In this embodiment of the present invention, AP box 90 is partially or fully closed and vacuum boxes 91, 92, 93 are open but the amount of vacuum applied is significantly reduced (compared to conventional processing) to avoid compressing the base mat 15. In contrast, in the standard production line, AP box 90 is fully open and the first, second and third vacuums boxes 91, 92, 93 are fully open.

Vacuum boxes 94 and 95 are typically closed under the standard operating procedures and present invention operating procedures for this embodiment.

Thus, in this embodiment of the present invention water is removed by the AP vacuum box 90 applying a first partial vacuum to the pressed base mat of at most about 0.7 inches of Hg (0.00237 MPa), for example about 0.3 to 0.7 inches of Hg (0.00102 to 0.00237 MPa), e.g. about 0.5 inches of Hg (0.00169 MPa), for about 2-20 seconds and then the remaining vacuum boxes apply a second vacuum to the pressed base mat of about 2.0 to about 4.0 inches of Hg (about 0.00677 to about 0.0135 MPa) for about 2-20 seconds, to increase the level of vacuum drainage without significantly compressing the mat through static pressure. This embodiment results in the dewatered, dried base mat (in other words the base mat after drier 200) having a density of about 10.9 to about 15.0 pounds per cubic foot (about 174.6 to about 240.3 gram/liter), and a noise reduction coefficient of about 0.80 to about 0.95.

If desired according to the present invention, the after press vacuum box 90 is adjusted to be in the fully closed position and the first vacuum box 91 in the first dryer zone 100 is adjusted to be in at least a partially closed position to apply a first partial vacuum to the pressed base mat of at most about 0.7 inches of Hg, for example about 0.3 to 0.7, e.g. about 0.5, inches of Hg for about 2-20 seconds and then at least one additional box 92, 93, 94 and/or 95 is adjusted to be in a fully open position to apply to the pressed base mat a vacuum pressure greater than that applied by first vacuum box 91, for example about 2.0 to about 4.0 inches of Hg for about 2-20 seconds.

Of course, any number of vacuum boxes may be used and controlled to have the desired controlled vacuum such that water is removed by applying a first partial vacuum to the pressed base mat of at most about 0.7 inches of Hg, e.g., about 0.3 to 0.5 inches of Hg for about 2-20 seconds and then applying a second vacuum to the pressed base mat of about 2.0-4.0 inches of Hg for about 2-20 seconds to increase the level of vacuum drainage without significantly compressing the base mat through static pressure to result in the dewatered, dried base mat having a density of about 10.9 to about 15.0 pounds per cubic foot, and a noise reduction coefficient of about 0.80 to about 0.95.

Preferably according to the present invention the vacuum drainage is accomplished by applying a first vacuum to the gravity drained base mat at a vacuum of at most about 0.7 inches of Hg, for example about 0.3 to 0.7, e.g. about 0.5, inches of Hg, for about 2-20 seconds, to remove about 18% to 34% of the water in the base mat and then applying a second vacuum to the gravity drained base mat to remove an additional 10% to 52% of the water from the gravity drained base mat (relative to the amount of water in the gravity drained base mat fed to the first vacuum step), wherein the second application of vacuum is typically at a vacuum of about 2.0-4.0 inches of Hg for about 2-20 seconds. Preferably these vacuum drainage steps increase the amount of vacuum drainage without significantly compressing the mat through static pressure, such that the vacuum draining increases the density of the dried base mat by 0% to 10%, typically 0 to 5%, on a dry basis relative to the gravity drained base mat. For example, if the dewatered base mat had a density of about 12 pounds per cubic foot (192 g/liter), then a 10% denser dried base mat would have a density of about 13.2 pounds per cubic foot (211 g/liter).

The thickness of the base mat before finishing with a back coating is typically in the range of about 0.80 to 1.2 inches (2.03 to 3.05 cm) for an NRC of the final panel in the range of 0.80 to 0.95. More typically the thickness of the base mat before finishing with a back coating is in the range of 0.90 inches (2.29 cm) at a density of 14 to 15 pounds per cubic foot (pcf) for a final panel with a nominal NRC of 0.80. When a panel having a NRC of about 0.90 is desired, the thickness of the base mat is typically designed to have a thickness of about 1.20 inches (3.05 cm) at a density of about 12.0 pcf (192 g/liter).

The CAC of the finished panel is typically in the range of about 33 to 36, with a CAC of at least 35 being desired for the final finished panel.

The present invention also provides a number of processes for controlling production of an acoustical panel to achieve desired acoustical properties.

A first embodiment provides a process of making a low density high mineral wool acoustical panel having a density of 10.9 to 12.6 pounds per cubic foot (175 to 202 g/liter) with improved acoustical absorption properties comprising:

selecting a target ENRC for the acoustical panel and determining a target thickness for the panel to achieve the target ENRC according to a formula:

$ENRC = 0.3618 \times Thickness\ in\ inches + 0.4748;$ providing a dilute aqueous slurry mixture comprising mineral wool, thermoplastic binder and starch and optional additives, wherein the aqueous slurry has a solids concentration of 3 to 6 wt. %;

distributing the dilute slurry onto a porous carrier;

dewatering the slurry by gravity drainage on the porous carrier over at least one gravity drainage box to form a gravity drained base mat;

vacuum draining the gravity drained base mat by applying a vacuum to the gravity drained base mat, after it leaves the at least one gravity drainage box, by passing the gravity drained base mat over at least a first vacuum box that applies a first vacuum and then by passing the gravity drained base mat over at least a second vacuum box that applies a second vacuum, wherein the second vacuum is a greater vacuum than the first vacuum, to remove water from the base mat without compressing the gravity drained base mat through static pressure by more than 10%;

wherein the conditions of dewatering the base mat and conditions of vacuum draining are adjusted to achieve a base mat density in the range of about 10.9 to 12.6 pounds per cubic foot to achieve an NRC within ±5% of the target ENRC.

A second embodiment provides a process of making an acoustical panel comprising a back coated base mat having a density of 12.5 to about 14.0 pounds per cubic foot (about 200 to 224 g/liter), the base mat comprising high mineral wool, with improved acoustical absorption properties comprising:

selecting a target NRC for the acoustical panel and determining a target thickness for the panel to achieve the target ENRC according to a formula:

$ENRC = 0.2376 \times Thickness\ in\ inches + 0.6328;$ providing a dilute aqueous slurry mixture comprising mineral wool, thermoplastic binder and starch and optional additives, wherein the aqueous slurry has a solids concentration of 3 to 6 wt. %;

distributing the dilute slurry on to a porous carrier;

dewatering the slurry by gravity drainage on the porous carrier over at least one gravity drainage box to form a gravity drained base mat;

vacuum draining the gravity drained base mat, after it leaves the at least one gravity drainage box, to form a vacuum drained mat by applying a vacuum to the gravity drained base mat by passing the gravity drained base mat over at least a first vacuum box that applies a first vacuum and then by passing the gravity drained base mat over at least a second vacuum box that applies a second vacuum, wherein the second vacuum is a greater vacuum than the first vacuum, to remove water from the base mat without compressing the mat through static pressure by more than 10% relative to the gravity drained base mat; wherein the vacuum drainage increases the density of the base mat by about 0% to 10%;

drying the base mat;

applying a back coating, of a type conventionally used in the art, in a thickness of about 1.5 to 2.0 mils to the dried base mat, wherein the conditions of dewatering the base mat and conditions of vacuum draining are adjusted to achieve a base mat density in the range of about 12.5 to about 14.0 pounds per cubic foot to achieve an NRC within ±5% of the target ENRC.

A third embodiment of the invention provides a process of making a high mineral wool acoustical panel with improved acoustical absorption properties comprising:

selecting a target NRC, for example an NRC of about 0.90, for the acoustical panel and determining a target thickness, for example about 1.10 to 1.20 inches, for the panel;

providing a dilute aqueous slurry mixture comprising mineral wool, thermoplastic binder and starch and optional additives, wherein the aqueous slurry has a solids concentration of 3 to 6 wt. %;

distributing the dilute slurry on to a porous carrier;

dewatering the slurry by gravity drainage on a porous carrier over at least one gravity drainage box to form a gravity drained base mat, typically to form a gravity drained base mat having a water content of about 75% to about 85%;

vacuum draining the gravity drained base mat, after it leaves the at least one gravity drainage box, to form a vacuum drained base mat by applying a vacuum to the gravity drained base mat by passing the gravity drained base mat over at least a first vacuum box that applies a first vacuum and then by passing the gravity drained base mat over at least a second vacuum box that applies a second vacuum, wherein the second vacuum is a greater vacuum (more negative pressure) than the first vacuum, to remove water from the base mat without compressing the mat through static pressure by more than 10% relative to the gravity drained base mat;

wherein the density of the gravity drained mat on a dry basis is increased less than about 0% to 10% during the vacuum drainage relative to the density of the gravity drained base mat prior to vacuum drainage;

wherein the conditions of dewatering and vacuum draining, are adjusted to achieve a base mat at density in the range of about 10.9 to 14.0 pounds per cubic foot (about 175 to 224 g/liter) to achieve an NRC within ±5% of the target ENRC of about 0.90 at base mat thicknesses of about 1.10 to 1.20 inches (2.79 to 3.05 cm).

EXAMPLES

The following examples will serve to illustrate the preparation of several acoustical tile compositions by a process within the scope of the present invention. It is understood that the examples are set forth for illustration purposes and many other compositions and process conditions are within the scope of the present invention. Those skilled in the art will recognize similar acoustical tile compositions may be prepared containing other ingredients and other quantities than those illustrated below.

Example 1

This example employed a target mixture comprising about 93 wt. %, mineral wool, about 4.7 wt. %, thermoplastic binders and about 2.0 wt. %, starch on a dry ingredient basis.

The panels were made as described above in the section entitled "Making a Panel of the Present Invention".

The Gravity Drainage Box Settings (see FIG. 3A) and Vacuum Box Settings (see FIG. 3B) for the Hi-NRC acoustical boards of the present invention are compared to the current commercial MARS® acoustical board, which has an NRC of 0.70, in TABLES 2 and 3. The gravity drainage boxes are labeled 1, 2, 3 and 4 as in FIG. 3A. The vacuum boxes are labeled 90, 91, 92, 93, 94 and 95 as in FIG. 3B.

TABLE 2

| | Gravity Drainage Box Settings | | | | | | |
|---|---|---|---|---|---|---|---|
| Product | Base mat Thickness (in.) | Base mat Density (lbs/ft³) | NRC | Gravity Box 1 | Gravity Box 2 | Gravity Box 3 | Gravity Box 4 |
| Standard MARS ® acoustical board | 0.810 | 15.0 | 0.70 | closed | closed | ½ open | open[1] |
| Hi-NRC acoustical board #1 | 0.900 | 14.5 | 0.80 | closed | closed | ½ open | open[1] |
| Hi-NRC acoustical board #2 | 1.050 | 12.5 | 0.90 | closed | closed | open | open[1] |

[1]Box 4 is always in the open position.

TABLE 3

Vacuum Box Settings

| Product | Base mat Thickness (in.) | Base mat Density (lbs/ft³) | NRC | After Press Box (AP Box 90) | Box 91 | Box 92 | Box 93 | Box 94 | Box 95 |
|---|---|---|---|---|---|---|---|---|---|
| Standard MARS ® acoustical board | 0.810 | 15.0 | 0.70 | Open (O) | O | O | O | C | C |
| Hi-NRC acoustical board #1 | 0.900 | 14.5 | 0.80 | C¹ | O | O | O | C | C |
| Hi-NRC acoustical board #2 | 1.050 | 12.5 | 0.90 | C² | ½ C | O | O | C | C |
| Vacuum Pressure In Boxes³ | | | | | 1.8" Hg | 2.3" Hg | 2.1" Hg | 2.6" Hg | 0.0" Hg | n.a. |

¹The AP Box is optionally partially closed as a method of lowering the density of the base mat.
²The AP Box is closed completely and Vacuum Box 91 is partially closed as a method of lowering the density of the base mat.
³The vacuum pressure values are for normal production.

In one embodiment, a 0.900 inch thick product with a nominal 14-14.5 pound/ft³ Hi-NRC product with an NRC of 0.80 can be obtained by setting the gravity boxes 1 and 2 on closed, the gravity box 3 one-half open and the gravity box 4 fully open. As the base mat leaves the wet end it is run through the fully open AP box 90 and vacuum boxes 91, 92 and 93 with vacuum boxes 94 and 95 being fully closed. If necessary, the vacuum in the AP box can be partially closed to provide more caliper and lower density to the base mat.

The amount of vacuum applied to the base mat after it exits the gravity drainage stage and press of the wet process depends upon the design of the particular process equipment used to vacuum drain and dry the base mat after pressing. However, it is important in the practice of the present invention that the base mat is first treated under a partial vacuum to remove a first portion of the water without reducing the thickness and increasing the density of the base mat more than about 5-10%. Then the base mat can be treated with a higher level of vacuum to remove more of the water when the water will not produce a static pressure that will further increase the density of the base mat.

In the particular equipment, as shown in FIGS. 3A and 3B, used in the plant trials of this example it was found that removing water by applying a first partial vacuum of about 0.5 inches of Hg for about 2-20 seconds to the pressed base mat and then applying a second vacuum of about 2.0-4.0 inches of Hg for about 2-20 seconds to the pressed base mat achieved sufficient vacuum drainage without significantly compressing the mat through static pressure.

In other words, the water is removed by the first step vacuum by a vacuum which is sufficiently weak to not significantly compress the base mat. However, the weak vacuum removes enough water so that, by the time the stronger vacuum of the second vacuum step is applied, there is not enough water present to create sufficient static pressure to significantly compress the base mat.

The pressing and compressing of the dewatered base mat is limited to avoid increasing the density of the base mat by more than about 1.0 pounds per cubic foot or about 5-10% of the density of the base mat. For example, compressing in the weaker vacuum will be less than 10% (for example less than 5%) and compression in the stronger vacuum will be less than 5% (for example less than 2%), each, with a total compression of the base mat of less than 10% relative to the gravity drained base mat.

Example 2

Preparation of Plant Scale Boards

The press was raised to the maximum position, gravity drainage was maximized, and vacuum in the press box was varied while other vacuum settings were left in their conventional position. Thus, the trial conditions for this data included a raised top wire former 70 (hereinafter also referred to as a "press") raised to a maximum position, maximized gravity drainage and variable vacuum settings on the AP vacuum box with the other vacuum settings the same as the standard MARS® acoustical board product. Any dust and broke has been removed. Note that the wet end sample is taken immediately after the AP vacuum box. TABLE 4 shows the resulting data.

TABLE 4

| Board # | Press Vacuum Box (in Hg) | Thickness (in) | Weight (lbs) | Density (lbs/ft³) | Moisture Content (%) | ENRC |
|---|---|---|---|---|---|---|
| 1A | 0.00 | 1.186 | 41.21 | 11.08 | 84.2 | 0.890 |
| 1B | 0.00 | 1.172 | 40.05 | 10.90 | 84.2 | 0.890 |
| 2A | 0.50 | 1.049 | 38.30 | 11.64 | 81.4 | 0.875 |
| 2B | 0.50 | 1.042 | 39.46 | 12.08 | 81.4 | 0.875 |
| 3A | 1.00 | 0.958 | 35.28 | 11.74 | 73.8 | 0.834 |
| 3B | 1.00 | 0.987 | 36.69 | 11.85 | 73.8 | 0.834 |
| 4A | 1.40 | 0.984 | 36.82 | 11.93 | 70.7 | 0.836 |
| 4B | 1.40 | 0.983 | 37.00 | 12.00 | 70.7 | 0.836 |

The data of TABLE 4 demonstrates the effect that the press vacuum box (AP vacuum box, e.g. first vacuum box 90 of FIG. 3B) has on thickness, density, moisture content and ENRC. In particular, TABLE 4 shows the effect of adding vacuum is not only to remove water from the base mat but to also increase the density of the base mat (note reduced thickness) and reduce the sound absorption.

The above results further show the effect that the amount of vacuum has on mat density and on reducing the acoustical absorption properties of the panel.

The above results indicate by maximizing gravity drainage in combination with raising the press position, a nominal 11-12 pcf density wool fiber based acoustical board can be obtained with an NRC at or above 0.80. The nominal density of 12 pcf (192 kg/m3) is maintained at the trimmer despite the static pressure exerted by the later vacuum boxes and flow-through drying. Thus, by increasing the extent of gravity drainage, the resulting static pressure is less thereby resulting in less "pressing" of the board.

Example 3

Preparation of Plant Scale Boards

The trial data of TABLE 5 demonstrates that simply raising the press has a minimal effect on thickness, density, and ENRC. The only difference between these two sets of data ("control" and "No Press") was that the top wire former 70 was raised to its maximum position for the samples labeled "No Press". The samples were taken at the trimmer and no wet end samples were taken. The press was raised to the maximum position from (from 0.780 inches to 1.187 inches). The gravity box settings were left in the standard positions.

TABLE 5

| Board # | Press Vacuum Box (inches Hg) | Thickness (in) | Weight (lbs) | Density (lbs/ft³) | ENRC |
|---|---|---|---|---|---|
| Control #1 | 1.86 | 0.826 | 38.45 | 14.84 | 0.704 |
| Control #2 | 1.86 | 0.815 | 38.94 | 15.24 | 0.700 |
| No Press #1 | 1.86 | 0.847 | 37.61 | 14.16 | 0.730 |
| No Press #2 | 1.86 | 0.818 | 36.83 | 14.36 | 0.729 |
| No Press #3 | 1.86 | 0.851 | 37.07 | 13.89 | 0.707 |

Simply raising the press (in the absence of also increasing gravity drainage and reducing vacuum settings produced only a small reduction in base mat density and only a slight increase in acoustical absorption.

Example 4

Plant Scale Test with Free Form Density

The results above can be compared to the results obtained when the gravity drainage is maximized and the press vacuum box is closed. Any dust or broke have been removed.

A trial was run as in Example 3 above but with the following operating conditions: the press was raised to its maximum, gravity drainage maximized and the press vacuum box closed. Any dust or broke have been removed.

The following wet end samples were taken immediately after the wet end water jet which is conventionally used to cut the base mat at pre-selected 8-10 foot panel lengths. A metal plate was slid under the wet base mat immediately after the wet end jet, lifting the plate and sample away from the wire. The wet sample was then dried, removed from the plate, and the thickness and density of the sample was determined. The resulting data is shown in TABLE 6.

TABLE 6

| Board # | Press Vacuum Box (inches Hg) | Thickness (in) | Weight (lbs) | Density (lb/ft³) | ENRC |
|---|---|---|---|---|---|
| 1A | 0.00 | 1.355 | 48.53 | 11.45 | 0.954 |
| 1B | 0.00 | 1.296 | 48.83 | 12.02 | 0.947 |

Example 5

Water, mineral wool, starch, and thermoplastic binder are combined and mixed to achieve a homogeneous mix. Gravity drainage is applied in four gravity drainage boxes with the first 2 boxes being closed and the third box half open and the fourth box open for the standard MARS® brand acoustical board. The Hi-NRC acoustical board #1 was made on a production line which had the first two gravity drainage boxes close, the third gravity drainage box half open and the fourth gravity drainage box open. The Hi-NRC acoustical board #2 was made on a production line which had the first two gravity drainage boxes closed, the third gravity drainage box half open and the fourth gravity drainage box open.

The Hi-NRC acoustical board #1 was made on a production line in which the AP vacuum box was optionally partially closed, vacuum boxes #91-93 were left fully open and vacuum boxes #4-5 were left fully closed. The Hi-NRC acoustical board #2 was made on a production line which had the AP vacuum box was fully closed, vacuum boxes #91 was left half closed, vacuum box #92-93 were left fully open and vacuum boxes #94-95 were left fully closed.

Physical properties were tested for the following plant scale boards for the standard MARS brand acoustical board and the HI-NRC #1 and #2 boards, made in accordance with the process of this invention using the same composition as the standard board. The results are shown in TABLE 7.

TABLE 7

| TEST | Standard MARS ® brand Acoustical Board | Hi-NRC board #1 | Hi-NRC board #2 |
|---|---|---|---|
| Density (pcf) | 15.0 | 14.0 | 12.0 |
| Thickness (in.) | 0.710 | 0.900 | 1.100 |
| Noise Reduction Coefficient (NRC) | 0.70 | 0.80 | 0.85 |
| Ceiling Attenuation Class (CAC) | 35 | 35 | 33 |

Example 6

The press was raised to the maximum position, gravity drainage was maximized, and vacuum in the press box was varied while other vacuum settings were left in their conventional position. Any dust and broke have been removed.

As shown in the results in the following TABLE 8 and the graph of these estimated NRC (hereinafter referred to as ENRC) versus density in FIG. 4, an analysis of the data shows an excellent correlation between thickness and density and the resulting ENRC for densities of 10.9 to 12.6 pcf.

Figure 4:
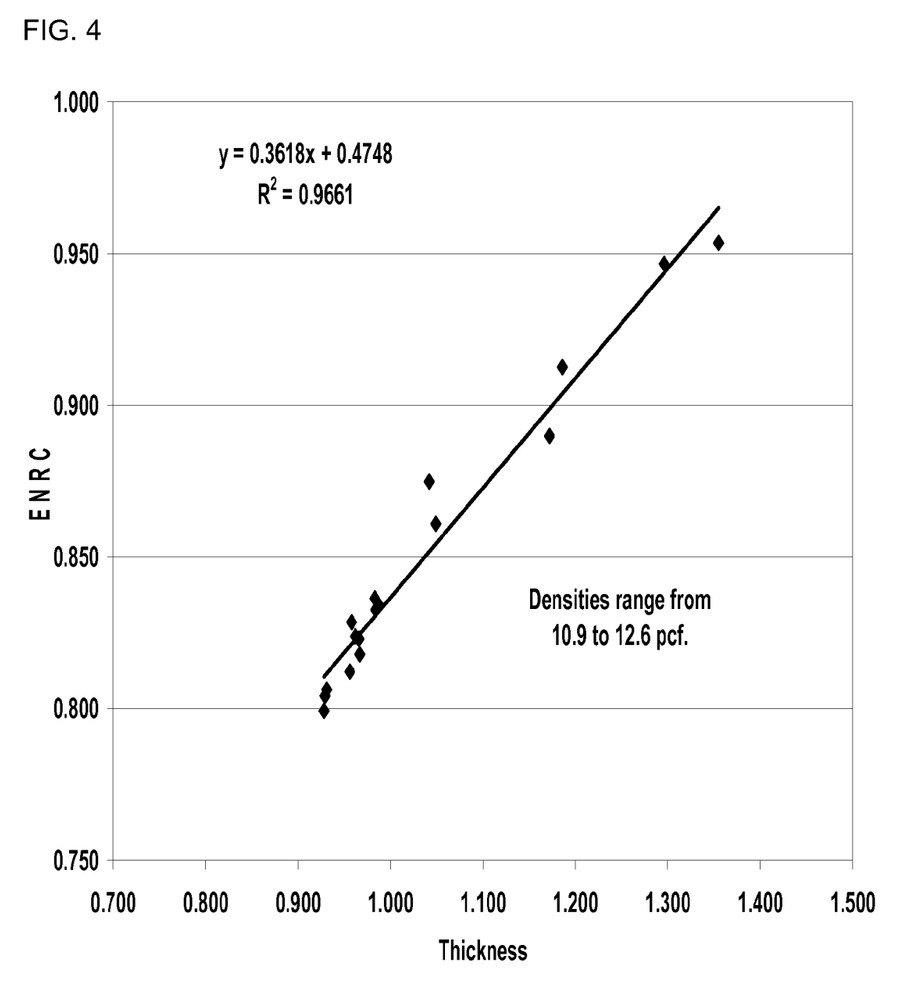
FIG. 4 is a graph of estimated noise reduction coefficient value, ENRC, versus panel thickness for back coated panels produced in accordance with the process of the invention.

The equation ENRC=0.3618×Thickness in inches+0.4748 fits the data of FIG. 4.

These results confirm that a thickness of approximately 1.1 inches at a density of 12 pcf should yield a 0.85 NRC product.

TABLE 8

| Board # | Thickness (in.) | Density (lb/ft³) | ENRC |
|---|---|---|---|
| 1 | 1.355 | 11.45 | 0.954 |
| 2 | 1.296 | 12.02 | 0.947 |
| 3 | 1.186 | 11.08 | 0.913 |
| 4 | 1.172 | 10.90 | 0.890 |
| 5 | 1.049 | 11.64 | 0.861 |
| 6 | 1.042 | 12.08 | 0.875 |
| 7 | 0.958 | 11.74 | 0.829 |
| 8 | 0.987 | 11.85 | 0.834 |
| 9 | 0.984 | 11.93 | 0.833 |
| 10 | 0.983 | 12.00 | 0.836 |
| 11 | 0.928 | 12.58 | 0.799 |
| 12 | 0.931 | 12.39 | 0.806 |
| 13 | 0.956 | 12.01 | 0.812 |
| 14 | 0.967 | 11.92 | 0.818 |
| 15 | 0.966 | 12.00 | 0.823 |
| 16 | 0.962 | 11.88 | 0.824 |
| 17 | 0.974 | 11.45 | n.a.[1] |
| 18 | 0.929 | 12.36 | 0.804 |

[1] ENRC not available

Example 7

The following example was designed to determine the relative effect of conventional gravity drainage process (drainage boxes 1 and 2 closed, 3 half open and 4 open) versus the maximized gravity drainage of this invention (drainage boxes 1 closed drainage boxes and 2, 3 and 4 open) and standard vacuum settings (AP box and vacuum boxes 91, 92, 93 (of FIG. 3B) fully open and vacuum boxes 94 and 95 closed) versus the gradual vacuum settings of the present invention (AP box closed and vacuum boxes 91 partially open, and vacuum boxes 92 and 93 fully open and vacuum boxes 94 and 95 closed). Board data of TABLE 9 was obtained for 1"×1" samples in the following trials.

TABLE 9

| Board | Press Position | Gravity Drainage | Vacuum Boxes | Thickness inches | Density pcf |
|---|---|---|---|---|---|
| 1 | Raised | Standard | Standard Settings | 0.905 | 12.75 |
| 2 | Raised | Maximum | Standard Settings | 0.925 | 12.67 |
| 3 | Raised | Maximum | Increasing | 1.030 | 11.69 |
| 4 | Raised | Standard | Increasing | 1.000 | 12.46 |

TABLE 10 shows the resulting data.

TABLE 10

| Board | Press Position | Gravity Drainage | Vacuum Boxes | Thickness | Density | ENRC |
|---|---|---|---|---|---|---|
| 1 | Raised | Standard Settings | Standard Settings | 0.861 | 13.34 | 0.755 |
| 2 | Raised | Maximum | Standard Settings | 0.904 | 13.15 | 0.792 |
| 3 | Raised | Maximum | Increasing | 0.959 | 12.49 | 0.806 |
| 4 | Raised | Standard | Increasing | 0.953 | 12.69 | 0.807 |

The results in TABLE 10 indicate by maximizing gravity drainage and providing for increasing vacuum levels in combination with raising the press position, it is possible to achieve a nominal 12.5 pcf (200 kg/m3) density product. The benefit due to maximizing gravity drainage was a reduction in density of 0.20 pcf (3.2 kg/m3) versus a benefit of 0.65 pcf (10.4 kg/m3) with increasing the vacuum levels.

Example 8

The following plant trial was conducted to produce a nominal 1.25 in. (3.2 cm) final thickness and 12.0 lb/ft³ (192 kg/m³) density product. During the trial the press was raised to a maximum position. The gravity drainage boxes were adjusted as follows: Box 4 open; Box 3 open; Box 2 ½ open and Box 1 closed. The vacuum boxes 91, 92, 93, 94, 95 (FIG. 3B) were adjusted as follows for Trial 1 compared to the control ("C"). The process conditions for the gravity drainage boxes and the vacuum boxes are shown in TABLES 11 and 12.

TABLE 11

| Gravity Drainage Box Settings | Drainage Box 4 | Drainage Box 3 | Drainage Box 2 | Drainage Box 1 |
|---|---|---|---|---|
| Standard Settings | Open* | ½ open | closed | closed |
| Trial Settings | Open* | open | ½ open | closed |

*Box 4 is always open.

TABLE 12

| Vacuum Box Settings | Wire Former (Press) Position | AP (wet) Box | Box 1 | Box 2 | Box 3 | Box 4 | Box 5 |
|---|---|---|---|---|---|---|---|
| Standard | down | open | open | open | open | closed | closed |
| Trial | raised | closed | ½ open | open | open | closed | closed |

The after press vacuum box was basically shut but a reading of 0.0-0.2 inches Hg (0-0.5 cm Hg) was measured. No wet samples were taken and dust and broke were removed.

The following two sets of 10 samples in TABLES 13 and 14, below, were collected and then tested.

TABLE 13

| Thickness (in.) | Density (lb/ft³) | Back coating | NRC | CAC |
|---|---|---|---|---|
| 1.025 | 12.25 | Base mat | 0.908 | n.a[1] |
| 1.075 | 12.24 | Base mat | 0.925 | n.a[1] |
| 0.825 | 15.97 | Yes | 0.795 | 34 |
| 0.800 | 13.4 | Yes | 0.808 | n.a[1] |
| 0.875 | 12.95 | Yes | 0.848 | n.a[1] |
| 0.913 | 13.43 | Yes | 0.858 | n.a[1] |
| 1.025 | 13.15 | Yes | 0.875 | n.a[1] |
| 1.025 | 12.25 | No | 0.878 | n.a[1] |

TABLE 13-continued

| Thickness (in.) | Density (lb/ft³) | Back coating | NRC | CAC |
|---|---|---|---|---|
| 1.100 | 13.09 | Yes | 0.883 | 33 |
| 1.088 | 12.68 | No | 0.900 | n.a. |

[1]CAC value not available

TABLE 14

| Thickness (inches) | Density (lb/ft³) | Back coating | MOR (lbs) | Hardness (lbs) |
|---|---|---|---|---|
| 1.074 | 12.51 | Base mat only | 35.9 | 29.0 |
| 1.063 | 12.45 | Base mat only | 38.9 | 29.0 |
| 0.814 | 16.46 | Yes | 129.1 | 65.0 |
| 0.792 | 13.94 | Yes | 92.6 | 40.0 |
| 0.865 | 13.09 | Yes | 95.6 | 46.0 |
| 0.912 | 13.78 | Yes | 99.5 | 50.0 |
| 1.008 | 13.45 | Yes | 90.7 | 49.0 |
| 1.013 | 13.01 | No | 93.7 | 49.0 |
| 1.086 | 13.57 | Yes | 86.3 | 48.0 |
| 1.009 | 12.75 | No | 85.0 | 50.0 |

Based upon the above trial data, using a wet end set-up consisting of increased gravity drainage and gradual vacuum, it is possible to achieve base mat densities in the range of about 12-12.5 pounds per cubic foot with resulting full scale NRC values for the final back coated panel within the range of about 0.80 to 0.90 depending upon the thickness of the base mat.

Figure 5:
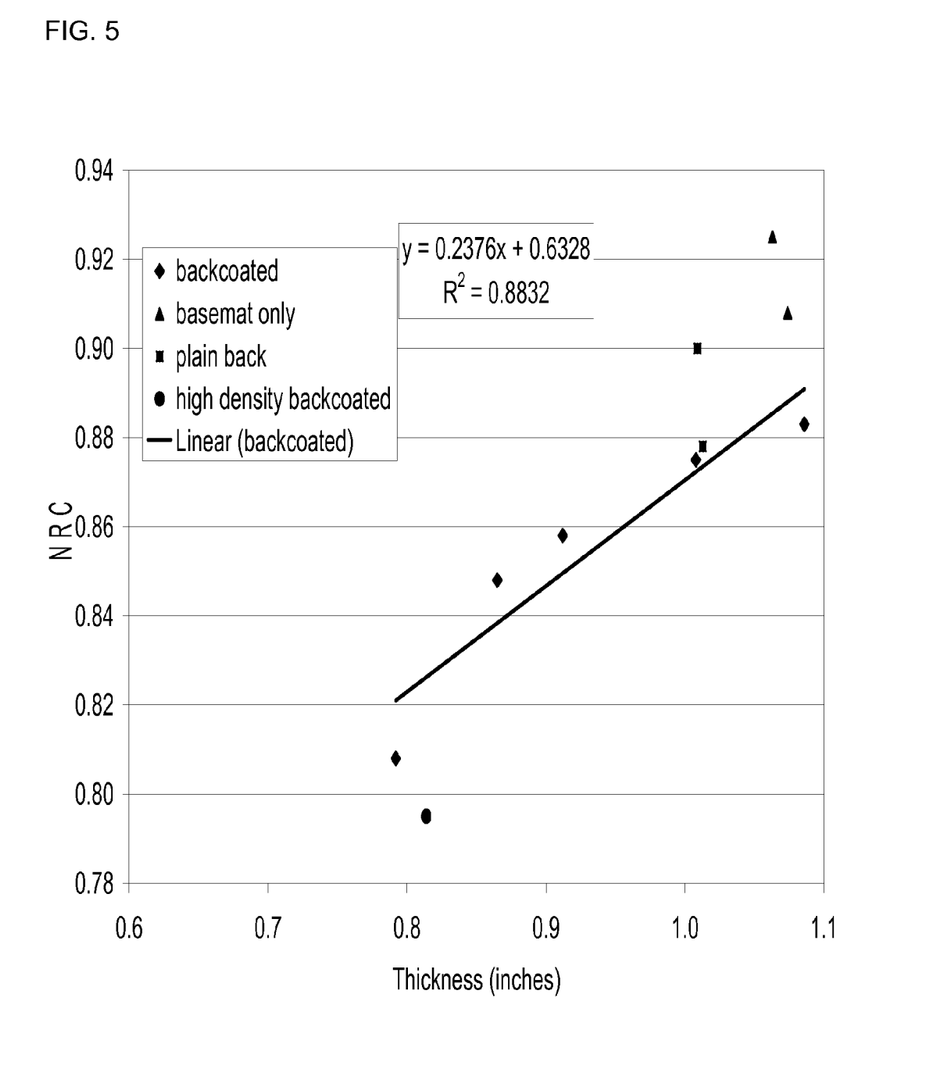
FIG. 5 is a graph of NRC value versus panel thickness for base mats and back coated panel at densities within the scope of the invention.

As shown in the TABLE 15 and the graph in FIG. 5, the NRC value increases with the thickness of the base mat and unfinished base mats and plain backed products have higher NRC values than back-coated products. A base mat of about 0.85 to 0.90 inch thickness is required to obtain an NRC value of about 0.85 while a base mat of about 1.2 inch or more thickness is required to obtain an NRC value of about 0.90. The data also confirms higher density products exhibit lower NRC values.

TABLE 15

| Board # | Thickness (in.) | Density (lb/ft³) | Back coating | NRC |
|---|---|---|---|---|
| 1 | 1.074 | 12.51 | Base mat only | 0.908 |
| 2 | 1.063 | 12.45 | Base mat only | 0.925 |
| 3 | 1.013 | 13.01 | Plain back | 0.878 |
| 4 | 1.009 | 12.75 | Plain back | 0.900 |
| 5 | 0.814 | 16.46 | High density back coating | 0.795 |
| 6 | 0.792 | 13.94 | Back coating | 0.808 |
| 7 | 0.865 | 13.09 | Back coating | 0.848 |
| 8 | 0.912 | 13.78 | Back coating | 0.858 |
| 9 | 1.008 | 13.45 | Back coating | 0.875 |
| 10 | 1.086 | 13.57 | Back coating | 0.883 |
| 11 | 0.914 | | Back Coating | 0.850 |

A line plotted through the data of FIG. 5 results in the relationship ENRC=0.2376×Thickness in inches+0.6328 between the NRC value and the thickness of the trial samples for only latex back coated base mats having a density of 12.5 to about 14.0 pounds per cubic foot.

Example 9

The following trials were designed to produce a 0.900 inch (2.3 cm) final thickness product with 14.0 pcf (224 kg/m³) density. The trial wet end conditions are shown in TABLE 16.

The trial runs marked "Control" are runs at control conditions prior to beginning the trial. The trial consisted of raising the press and slowing the line down slightly while maintaining the stock slurry flow rate to generate a 1.000 inch base mat. The after press (AP) vacuum box was also shut part way to achieve a higher caliper on the wet end.

TABLE 16

| Trial Number | Control | Control | #1 | #2 |
|---|---|---|---|---|
| Press Position | 0.813 | 0.813 | 1.165 | 1.165 |
| Dry Wt/Ft² | 440 | 442 | 527 | 508 |
| Trimmer Density (lb/ft³) | 14.7 | 14.6 | 14.1 | 13.6* |

*Unground trimmer base mat density.

The following test data listed in TABLE 17 and TABLE 18 was obtained from the two trial conditions listed in Table 16.

TABLE 17

| Sample | T1 | T2 |
|---|---|---|
| Base mat (unground) Density (lb/ft³) | 14.1 | 13.6 |
| Ground Density (lb/ft³) | 14.34 | 14.36 |
| Finished Density (lb/ft³) | 16.2 | 15.5 |
| Thickness (in) | 0.906 | 0.907 |
| ENRC | 0.801 | 0.796 |
| ECAC | 37.7 | 37.2 |
| MOR (lbs) | 80.4 | 76.5 |
| Break Load (lbs) | 29.3 | 28.0 |
| Hardness (lbs) | 221 | 205 |

TABLE 18

Acoustical Lab Data

| Board | Finished Density (lb/ft³) | Thickness (in) | NRC | CAC |
|---|---|---|---|---|
| T1 | 15.24 | 0.925 | 0.813 | 36 |
| T2 | 15.11 | 0.913 | 0.818 | 36 |

Example 10

Figure 6:
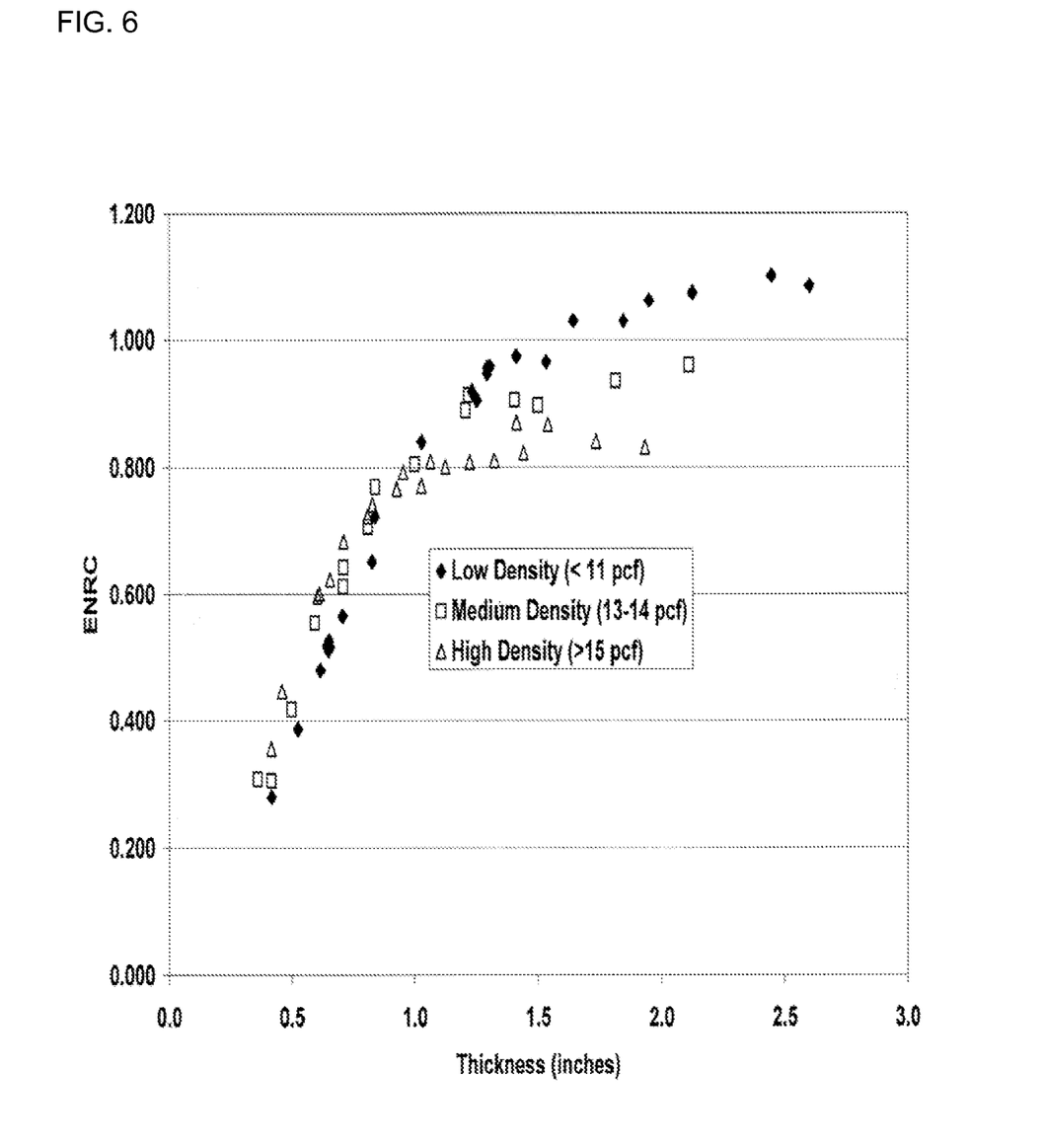
FIG. 6 is a graph of estimated noise reduction coefficient value versus panel thickness for low, medium and high density base mats produced in accordance with the process of the invention.

TABLES 19, 20 and 21 report a large number of samples, with low density, i.e., density of about 10-11 pcf; medium density, i.e., 13-14 pcf, and high density, i.e., over 15 to about 16.7 pcf, to show the correlation between panel thickness and ENRC for the unfinished panel. The trials are reported for low density ("LD"); medium density ("MD") and high density ("HD"). The graph in FIG. 6 shows the relationship between panel thickness and ENRC for the three tested density ranges.

TABLE 19

| Trial | ENRC | WEIGHT (grams) | THICKNESS (inches) | DENSITY (lbs./ft³) |
|---|---|---|---|---|
| LD1 | 0.651 | 25.590 | 0.827 | 9.864 |
| LD2 | 1.101 | 75.870 | 2.446 | 9.887 |
| LD3 | 1.030 | 51.140 | 1.643 | 9.925 |
| LD4 | 0.974 | 44.820 | 1.412 | 10.116 |
| LD5 | 1.074 | 67.560 | 2.126 | 10.131 |
| LD6 | 0.566 | 22.520 | 0.707 | 10.154 |
| LD7 | 0.517 | 21.320 | 0.655 | 10.376 |
| LD8 | 0.958 | 42.740 | 1.305 | 10.437 |
| LD9 | 1.029 | 60.570 | 1.847 | 10.456 |
| LD10 | 0.918 | 40.580 | 1.232 | 10.497 |
| LD11 | 0.527 | 21.420 | 0.650 | 10.499 |
| LD12 | 0.480 | 20.380 | 0.616 | 10.540 |
| LD13 | 0.511 | 21.450 | 0.649 | 10.542 |
| LD14 | 1.085 | 86.230 | 2.600 | 10.574 |
| LD15 | 1.061 | 64.810 | 1.949 | 10.599 |

TABLE 19-continued

| Trial | ENRC | WEIGHT (grams) | THICKNESS (inches) | DENSITY (lbs./ft³) |
|---|---|---|---|---|
| LD16 | 0.515 | 21.480 | 0.646 | 10.600 |
| LD17 | 0.947 | 43.150 | 1.293 | 10.637 |
| LD18 | 0.386 | 17.580 | 0.525 | 10.675 |
| LD19 | 0.965 | 51.340 | 1.533 | 10.677 |
| LD20 | 0.840 | 34.530 | 1.028 | 10.706 |
| LD21 | 0.956 | 43.490 | 1.294 | 10.712 |
| LD22 | 0.519 | 21.700 | 0.645 | 10.731 |
| LD23 | 0.524 | 22.010 | 0.648 | 10.824 |
| LD24 | 0.723 | 28.660 | 0.839 | 10.892 |
| LD25 | 0.279 | 14.290 | 0.417 | 10.924 |
| LD26 | 0.905 | 42.990 | 1.251 | 10.951 |

TABLE 20

| Trial | ENRC | WEIGHT (grams) | THICKNESS (inches) | DENSITY (lbs/ft³) |
|---|---|---|---|---|
| MD1 | 0.612 | 29.050 | 0.709 | 13.058 |
| MD2 | 0.889 | 49.640 | 1.206 | 13.126 |
| MD3 | 0.960 | 87.020 | 2.112 | 13.132 |
| MD4 | 0.905 | 58.130 | 1.405 | 13.193 |
| MD5 | 0.418 | 20.590 | 0.497 | 13.196 |
| MD6 | 0.936 | 75.370 | 1.815 | 13.238 |
| MD7 | 0.555 | 24.800 | 0.593 | 13.327 |
| MD8 | 0.305 | 17.420 | 0.416 | 13.362 |
| MD9 | 0.805 | 41.930 | 1.000 | 13.369 |
| MD10 | 0.898 | 63.290 | 1.499 | 13.458 |
| MD11 | 0.707 | 34.260 | 0.810 | 13.490 |
| MD12 | 0.308 | 15.130 | 0.360 | 13.521 |
| MD13 | 0.913 | 51.970 | 1.217 | 13.617 |
| MD14 | 0.643 | 30.450 | 0.711 | 13.801 |
| MD15 | 0.769 | 36.150 | 0.839 | 13.871 |

TABLE 21

| Trial | ENRC | WEIGHT (grams) | THICKNESS (inches) | DENSITY (lbs/ft³) |
|---|---|---|---|---|
| HD1 | 0.742 | 38.680 | 0.829 | 15.027 |
| HD2 | 0.766 | 43.590 | 0.928 | 15.132 |
| HD3 | 0.624 | 30.470 | 0.655 | 15.210 |
| HD4 | 0.792 | 45.080 | 0.953 | 15.232 |
| HD5 | 0.801 | 53.490 | 1.124 | 15.322 |
| HD6 | 0.841 | 82.550 | 1.735 | 15.322 |
| HD7 | 0.822 | 68.750 | 1.441 | 15.366 |
| HD8 | 0.867 | 73.660 | 1.540 | 15.407 |
| HD9 | 0.808 | 59.130 | 1.223 | 15.574 |
| HD10 | 0.723 | 39.200 | 0.809 | 15.610 |
| HD11 | 0.356 | 20.170 | 0.415 | 15.638 |
| HD12 | 0.869 | 68.850 | 1.413 | 15.689 |
| HD13 | 0.771 | 50.240 | 1.027 | 15.749 |
| HD14 | 0.596 | 29.650 | 0.605 | 15.795 |
| HD15 | 0.832 | 94.980 | 1.934 | 15.817 |
| HD16 | 0.601 | 30.070 | 0.612 | 15.825 |
| HD17 | 0.811 | 65.920 | 1.323 | 16.045 |
| HD18 | 0.809 | 53.420 | 1.065 | 16.158 |
| HD19 | 0.684 | 35.850 | 0.711 | 16.235 |
| HD20 | 0.446 | 23.770 | 0.460 | 16.636 |

As shown in the TABLES 19, 20 and 21 as well as FIG. 6, an ENRC of between 0.800-about 0.950 was obtained under the process of the present invention with a relatively low density product of about 10 to 11 pcf with a thickness of between about 1.00 to 1.55 inches with a medium density product of about 13-14 pcf at a thickness of about 1.00 to 2.10 inches and with a relatively high density product of about 15 to 16.6 with a panel thickness of between about 1.10 to 2.10 inches.

Example 11

Two trial runs were made on a production line to make the Hi-NRC version of the MARS panel at a targeted base mat thickness of 1.20 inches and a targeted density of 12 pounds per cubic ft. to determine the solids content values for the base mat during the production run at the headbox, after the gravity drainage boxes and after the first or AP vacuum box. The results are reported in TABLE 22.

TABLE 22

| Production Run | Trial #1 | Trial #2 | Standard MARS Product |
|---|---|---|---|
| Thickness (in.) | 1.2 | 1.2 | 0.810 |
| Density lb/ft³ | 12 | 12 | 15 |
| Solids and water Content in Headbox (wt. %) | 4.50% solids 95.5% water | 4.50% solids 95.5% water | About 4.5-5.0% solids and 95.0-95.5% water |
| Solids (lb/ft³) | 1.2 | 1.2 | 1.0 |
| Total (lb/ft³) | 26.7 | 26.7 | 22.5 |
| Water (lb//ft³) | 25.5 | 25.5 | 21.5 |
| Solids Content and water content after gravity drainage boxes (wt. %) | 16% solids 84.0% water | 16.0% solids 84.0% water | About 20-25% solids and 75-80% water |
| Solids lb/ft³ | 1.2 | 1.2 | 1.0 |
| Total/lb/ft³ | 7.5 | 7.5 | 3.0 |
| Water lb/ft³ | 6.3 | 6.3 | 2.9 |
| Solids Content and water content after first (AP) vacuum box* (wt. %) | 30% solids 70.0% water | 26% solids 74.0% water | About 35% solids 65% water |
| Solids lb/ft² | 1.2 | 1.2 | 1.0 |
| Total lb/ft² | 4.0 | 7.5 | 2.9 |
| Water lb/ft² (wt. %) | 2.8 | 6.3 | 1.9 |

*The AP vacuum box is set at a setting of 0.5 in. Hg for the Hi-NRC MARS examples while the Standard MARS product has an AP vacuum box setting of 2.0 inches Hg.

Although it was not possible to measure the solids and water content after the second vacuum box and the sixth vacuum box within the multi-zone dryer for the Trials #1 and #2 in Example 12, above, it was estimated that the solids and water content after the second vacuum box would be 32% solids and 68% water for Trial #1 (2.6 lb/ft³ water and 1.2 lb/ft³ solids) and 30% solids and 70% water for Trial #2 (2.8 lb/ft³ water and 1.2 lb/ft³ solids). The estimated solids content after all six of the vacuum boxes is about 32-35% solids for both Trials #1 and #2, compared to an estimated solids content of about 37-40% solids for the standard MARS product.

Example 12

To show the effect of increasing vacuum after gravity drainage the following trials were conducted. The results are reported in TABLE 23.

TABLE 23

Base Mat Compression From Gravity Drainage At Increasing Vacuum

| Production Process | Thickness (in.) | Density (lb/cubic ft) | Thickness Decrease (%) | Density Increase (%) |
|---|---|---|---|---|
| After Gravity Drainage | 1.18 | 11.00 | | |
| Use of 0.5 in Hg vacuum - Density at Trimmer | 1.05 | 11.80 | 11.0 | 7.3 |

TABLE 23-continued

Base Mat Compression From Gravity Drainage At Increasing Vacuum

| Production Process | Thickness (in.) | Density (lb/cubic ft) | Thickness Decrease (%) | Density Increase (%) |
|---|---|---|---|---|
| Use of 1.0 in Hg vacuum - Density at Trimmer | 0.97 | 11.80 | 17.8 | 7.3 |
| Use of 1.4 in Hg vacuum - Density at Trimmer | 0.98 | 11.98 | 16.9 | 8.9 |

While particular embodiments of the present invention have been shown and described, it will be appreciated by those skilled in the art that changes and modifications may be made thereto without departing from the invention in its broader aspects and as set forth in the following claims.

We claim:

1. A process of making an acoustical ceiling panel with an open structure and improved acoustical absorption properties comprising;

providing a aqueous slurry mixture comprising mineral wool, at least one member of the group consisting of thermoplastic binder, starch and mixtures of thermoplastic binder and starch, and optional additives, wherein the aqueous slurry has a solids concentration of 3.0 to 6.0 wt. %;

distributing the slurry on a porous carrier;

dewatering the slurry on the porous carrier by gravity drainage over at least one gravity drainage box to form a gravity drained base mat, wherein the slurry is dewatered to a water concentration of 74 to 84 wt. %;

vacuum draining to remove water by applying a first vacuum to the gravity drained base mat for about 2-20 seconds to remove about 18% to 34% of the water in the gravity drained base mat and then applying a second vacuum to the compressed base mat to remove an additional 10% to 52% of the water from the base mat after it is subjected to the first vacuum application, wherein the second application of vacuum removes additional water from the base mat without compressing the thickness of the base mat through static pressure by more than 10% from the thickness of the gravity drained base mat; and wherein the vacuum drained base mat has a density of about 10.9 to about 15.0 pounds per cubic foot on a dry basis, and a noise reduction coefficient (NRC) of about 0.80 to about 0.95.

2. The process of claim 1, wherein the vacuum draining increases the density of the dewatered base mat by 0% to 10% on a dry basis relative to the gravity drained base mat.

3. The process of claim 1 wherein the second application of vacuum is at a higher level of vacuum than the first application of vacuum.

4. The process of claim 1, wherein the first vacuum is applied at a vacuum of at most 0.5 inches of Hg.

5. The process of claim 1, further including the step of back coating the base mat to give a final acoustical panel with a CAC value of at least 35.

6. The process of claim 1, wherein the series of gravity drainage boxes comprise four boxes and a first and second sequential gravity drainage boxes are placed in the fully closed position, a third gravity box is adjusted to be in a one-half open position to a fully open position and a fourth box is placed in a fully open position.

7. The process of claim 1, wherein the vacuum is applied by a series of vacuum boxes adjusted to provide gradually increasing vacuum to the base mat to remove most of the water from the base mat without creating a static pressure in the mat that would compress the thickness of the mat wherein the first portion of water is removed under a vacuum of less than 0.5 inches Hg and then the remainder of the water is removed under a vacuum of about 2-4 inches Hg.

8. The process of claim 1, wherein the series of vacuum boxes in the vacuum system comprises in series a first after press vacuum box, and one or more additional vacuum boxes in a first drying zone of a multiple zone dryer, through which the base mat passes downstream of the gravity drainage boxes and press.

9. The process of claim 1, including:

selecting a target estimated noise reduction coefficient value (ENRC) for the acoustical panel and determining a target thickness of the panel to achieve the target ENRC according to the formula:

$$ENRC = 0.3618 \times \text{Thickness in inches} + 0.4748$$

wherein the conditions of dewatering the slurry by gravity drainage and the conditions of vacuum draining are adjusted to achieve a base mat density in the range of about 10.9 to 12.6 pounds per cubic foot on a dry basis, to achieve an NRC within ±5% of the target ENRC.

10. The process of claim 1, including:

selecting a target NRC for the acoustical panel and determining a target thickness of the panel to achieve a target estimated noise reduction coefficient value (ENRC) according to a formula:

$$ENRC = 0.2376 \times \text{Thickness in inches} + 0.6328;$$

drying the dewatered base mat after vacuum draining;

applying a back coating of about 1.5 to 2.0 mils thickness to the dried base mat;

wherein the conditions of dewatering the base mat and the conditions of vacuum draining are adjusted to achieve a base mat density in the range of about 12.5 to about 14.0 pounds per cubic foot on a dry basis, to achieve an NRC within ±5% of the target ENRC.

11. The process of claim 1, including:

selecting a target NRC of about 0.90 for the acoustical panel and determining a target thickness about 1.10 to 1.20 inches for the panel;

wherein the conditions of dewatering and vacuum draining are adjusted to achieve a base mat density in the range of about 10.9 to 14.0 pounds per cubic foot on a dry basis, to achieve an NRC within ±5% of a target estimated noise reduction coefficient value (ENRC) of about 0.90 at base mat thicknesses of about 1.10 to 1.20 inches.

* * * * *